United States Patent

Greentaner et al.

[11] Patent Number: 5,838,081
[45] Date of Patent: Nov. 17, 1998

[54] MOTOR HAVING RECESSED AREA IN MOTOR CASE FOR RETAINING MOTOR SHAFT BEARING THEREIN

[75] Inventors: Lowell T. Greentaner, Tipp City; David J. Hemmert, Dayton, both of Ohio; Günter Kiehnle, Eppingen, Germany

[73] Assignee: ITT Automotive Electrical Systems, Inc., Auburn Hills, Mich.

[21] Appl. No.: 916,551

[22] Filed: Aug. 22, 1997

Related U.S. Application Data

[63] Continuation of Ser. No. 563,480, Nov. 28, 1995, abandoned.

[51] Int. Cl.$^6$ .............................. H02K 5/16; H02K 7/08
[52] U.S. Cl. ............................. 310/90; 310/89; 310/91
[58] Field of Search ................... 310/90, 91, 89

[56] References Cited

U.S. PATENT DOCUMENTS

| | | | |
|---|---|---|---|
| Re. 34,667 | 7/1994 | Neumann | 310/216 |
| 2,448,500 | 8/1948 | Turner | 308/72 |
| 2,922,682 | 1/1960 | Abel | 308/132 |
| 2,975,649 | 3/1961 | Propst | 74/424 |
| 3,068,713 | 12/1962 | Davis | 74/424 |
| 3,068,714 | 12/1962 | Davis | 74/459 |
| 3,302,477 | 2/1967 | Grabowski | 74/424 |
| 3,333,484 | 8/1967 | Young | 74/424 |
| 3,476,966 | 11/1969 | Willyoung | 310/270 |
| 3,714,705 | 2/1973 | Lewis | 310/90 |
| 3,855,486 | 12/1974 | Binder et al. | 310/49 |
| 3,937,097 | 2/1976 | Fund et al. | 74/424 |
| 4,074,158 | 2/1978 | Cole | 310/90 |
| 4,258,584 | 3/1981 | Haegele et al. | 74/424 |
| 4,400,639 | 8/1983 | Kobayashi et al. | 310/215 |
| 4,504,754 | 3/1985 | Stone | 310/90 |
| 4,647,803 | 3/1987 | Von De Heide | 310/51 |
| 4,716,327 | 12/1987 | Stone | 310/90 |
| 4,777,395 | 10/1988 | Taylor et al. | 310/90 |
| 4,780,632 | 10/1988 | Murray, III | 310/111 |
| 4,806,025 | 2/1989 | Kamiyama et al. | 384/202 |
| 4,823,032 | 4/1989 | Ward et al. | 310/43 |
| 4,839,552 | 6/1989 | Takaba | 310/268 |
| 4,868,436 | 9/1989 | Attilio et al. | 310/67 R |
| 4,887,480 | 12/1989 | Pollo | 74/459 |
| 4,924,127 | 5/1990 | Boireau et al. | 310/90 |
| 4,972,113 | 11/1990 | Newberg | 310/217 |
| 5,006,747 | 4/1991 | Stewart, Sr. | 310/239 |
| 5,008,572 | 4/1991 | Marshall et al. | 310/45 |
| 5,010,266 | 4/1991 | Uchida | 310/156 |
| 5,049,771 | 9/1991 | Challita et al. | 310/219 |
| 5,068,556 | 11/1991 | Lykes et al. | 310/90 |
| 5,068,557 | 11/1991 | Murugan | 310/90 |
| 5,087,847 | 2/1992 | Giesbert et al. | 310/90 |
| 5,088,362 | 2/1992 | Schalles | 82/142 |
| 5,113,114 | 5/1992 | Shih et al. | 310/270 |
| 5,128,571 | 7/1992 | Itsu | 310/67 |
| 5,296,773 | 3/1994 | El-Antably et al. | 310/261 |
| 5,321,328 | 6/1994 | Ide | 310/90 |
| 5,357,160 | 10/1994 | Kaneda et al. | 310/67 |
| 5,497,039 | 3/1996 | Blaettner et al. | 310/51 |

FOREIGN PATENT DOCUMENTS

| | | | |
|---|---|---|---|
| 0088946 | 9/1983 | European Pat. Off. | 310/90 |
| 0363304 | 4/1990 | European Pat. Off. | 310/90 |
| 2639161 | 5/1990 | France | 310/90 |
| 2673449 | 9/1992 | France | 310/90 |
| 57006549 | 1/1982 | Japan | 310/90 |
| 2213877 | 8/1989 | United Kingdom | 310/90 |

*Primary Examiner*—Steven L. Stephan
*Assistant Examiner*—Elvin G. Enad
*Attorney, Agent, or Firm*—J. Gordon Lewis; Thomas N. Twomey

[57] ABSTRACT

A motor includes a shaft having a load end portion and a retained end portion. The motor further includes a case assembly having a first end wall and a second end wall, wherein the first end wall has a recessed area defined therein, and the second end wall has an opening defined therein through which the load end portion of the shaft extends. Additionally, the motor includes a bearing which rotatably supports the retained end portion of the shaft, a portion of the bearing being positioned in the recessed area. A method of supporting a shaft of a motor within a case is also disclosed.

18 Claims, 2 Drawing Sheets

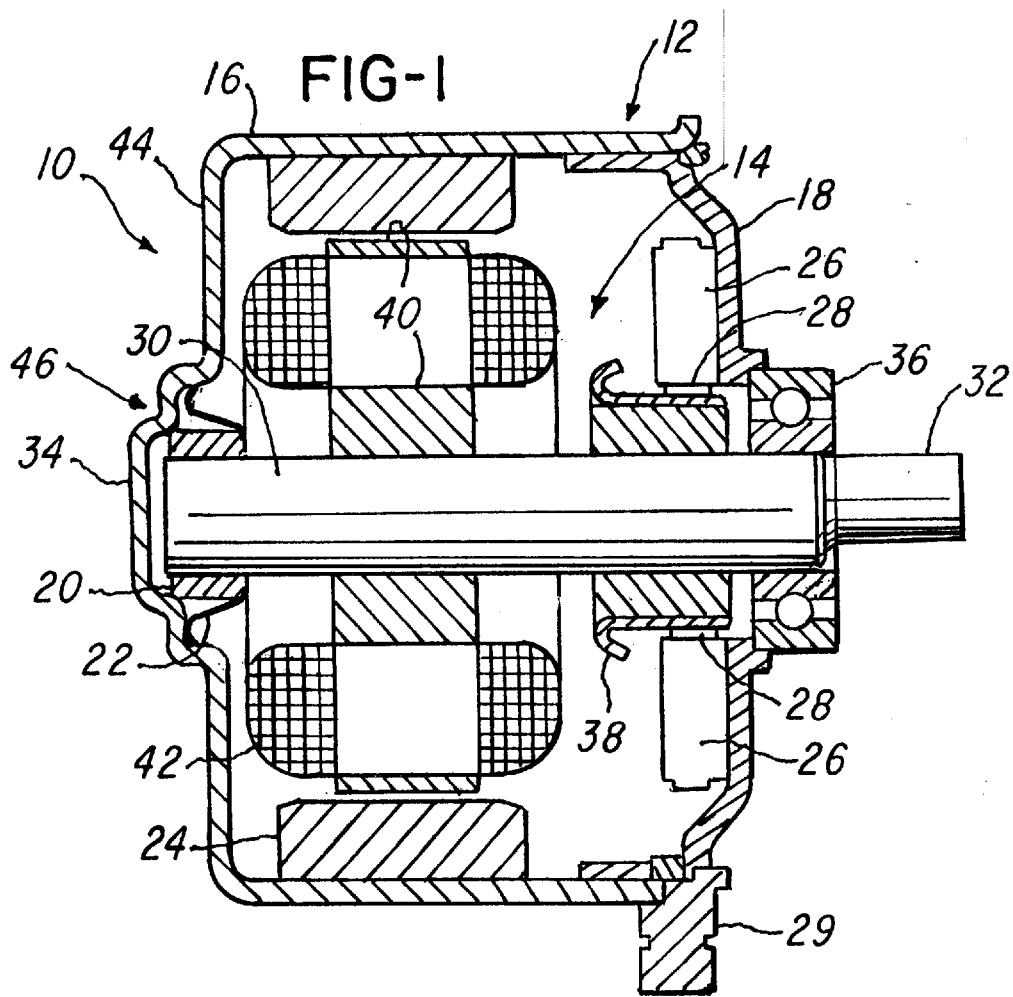
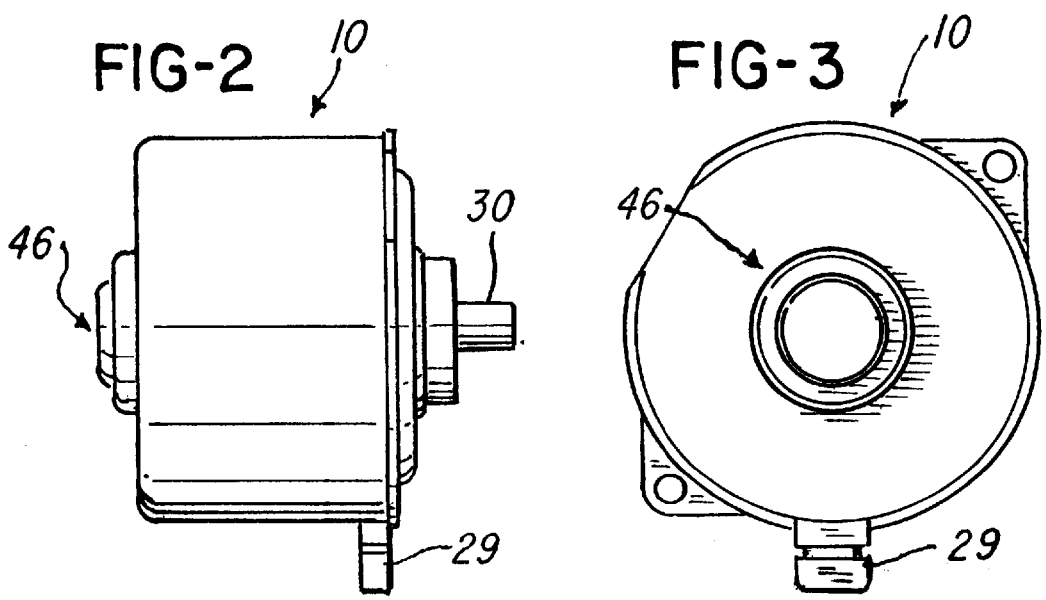

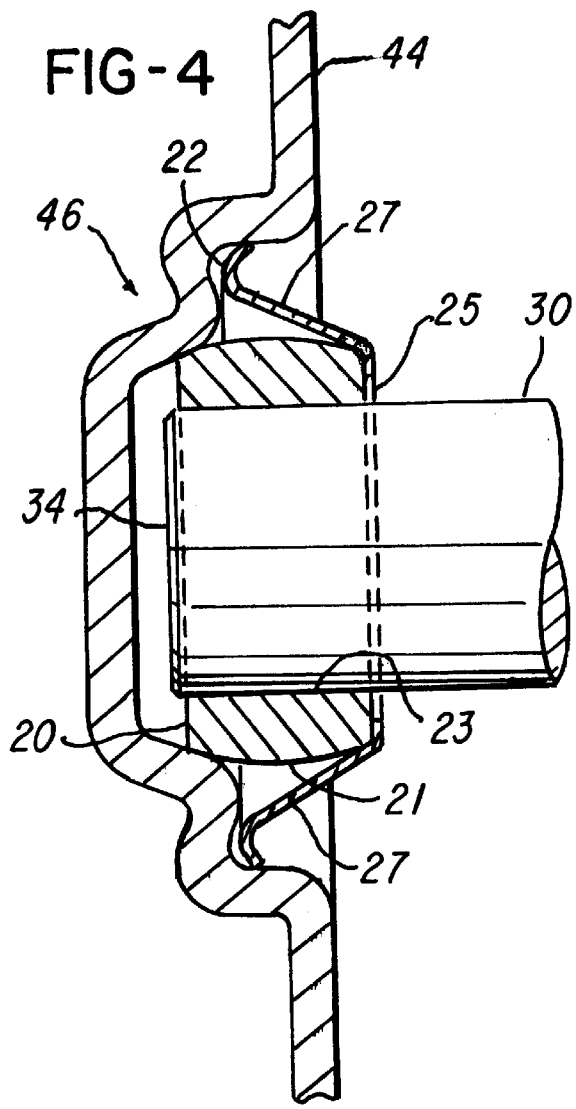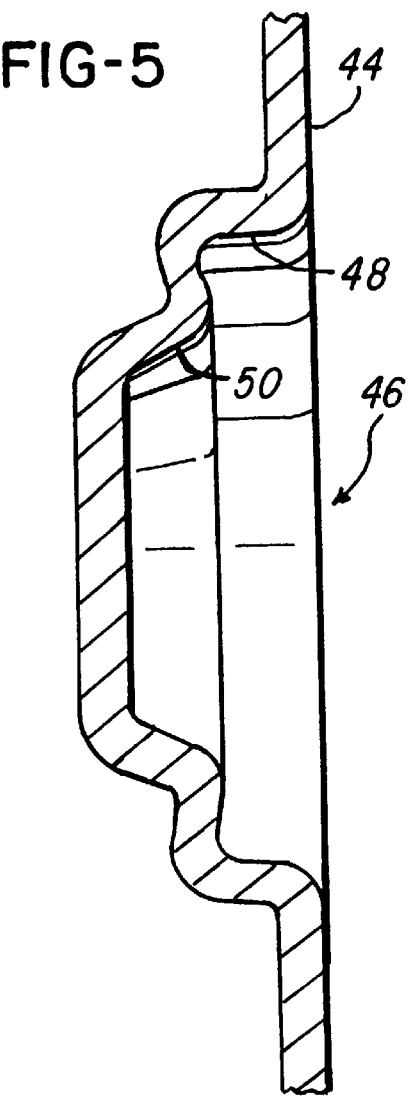

MOTOR HAVING RECESSED AREA IN MOTOR CASE FOR RETAINING MOTOR SHAFT BEARING THEREIN

RELATED APPLICATION

This is a continuation of application Ser. No. 08/563,480 filed Nov. 28, 1995 now abandoned.

BACKGROUND OF THE INVENTION

The present invention relates generally to a motor, and more particularly to a motor having a motor case which possesses a recessed area for retaining a motor shaft bearing therein.

Reducing the physical size of components which are used in automobiles is an ongoing objective in the automobile industry. One component which is widely used in automobiles is a motor. Motors are used in automobiles for a variety of purposes such as operating an electric window in a door assembly and operating a pump in a hydraulic braking system. Thus, reducing the size of motors which are used in automobiles would be desirable.

Also, motors are made up of numerous subcomponents. Facilitating ease of assembly of these numerous subcomponents would be desirable to manufactures of motors.

SUMMARY OF THE INVENTION

In accordance with one embodiment of the present invention, there is provided a motor which includes a shaft having an end portion. The motor further includes a case having a wall, said wall having a recessed area defined therein. The motor additionally includes a bearing which supports the end portion of the shaft, a portion of said bearing being positioned in the recessed area.

According to another embodiment of the present invention, there is disclosed a motor which includes a shaft having a load end portion and a retained end portion. The motor further includes a case assembly having a first end wall and a second end wall, wherein the first end wall has a recessed area defined therein, and the second end wall has an opening defined therein through which the load end portion of said shaft extends. Moreover, the motor includes a bearing which rotatably supports the retained end portion of said shaft, a portion of said bearing being positioned in the recessed area.

Pursuant to yet another embodiment of the present invention, there is provided a method of supporting a shaft of a motor within a case. The method includes the steps of (1) forming a recessed area in a wall of the case, (2) securing a portion of a bearing in the recessed area, and (3) supporting an end portion of the shaft within the bearing.

It is therefore an object of the present invention to provide a new and useful motor.

It is another object of the present invention to provide an improved motor.

It is another object of the present invention to provide a new and useful method of supporting a shaft of a motor in a motor case.

It is a further object of the present invention to provide an improved method of supporting a shaft of a motor in a motor case.

It is still another object of the present invention to provide a motor which has a reduced physical size.

It is yet another object of the present invention to provide a motor having parts which facilitate assembly of the motor.

The above and other objects, features, and advantages of the present invention will become apparent from the following description and the attached drawings.

BRIEF DESCRIPTION OF THE DRAWINGS

FIG. 1 is a cross-sectional view of a motor which incorporates the features of the present invention therein;

FIG. 2 is a reduced side elevational view of the motor of FIG. 1;

FIG. 3 is a reduced end elevational view of the motor of FIG. 1;

FIG. 4 is an enlarged cross-sectional view showing a recessed area of the motor case of the motor of FIG. 1, and further showing a portion of a bearing secured in the recessed area by a retainer, and still further showing an end portion of a motor shaft being supported by the bearing; and FIG. 5 is a view similar to FIG. 4, but showing the bearing, retainer and the end portion of the motor shaft removed for clarity of description, and showing the recessed area subdivided into a first recessed segment and a second recessed segment.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

FIGS. 1–3 show a motor 10 which incorporates the features of the present invention therein. Referring to FIG. 1, the motor 10 includes a case assembly 12 and an armature assembly 14.

The case assembly 12 includes a case 16, a bearing 20, a retainer 22 and a magnet 24. The case 16 is made from a carbon steel material. A brush holder assembly 18 is positioned adjacent to the case 16. The brush holder assembly 18 includes brush holders 26 which hold brushes 28. A set of electrical leads 29 are electrically connected to the brush holders 26. The bearing 20 is made from a bronze alloy material while the retainer 22 is made from a spring steel material.

The bearing 20 is a spherical bearing and is annular in shape. The bearing 20 defines an outer ring surface 21 and an inner ring surface 23 as shown in FIG. 4. A cross-section of the outer ring surface 21 defines a convex curve while a cross-section of the inner ring surface 23 defines a line.

Still referring to FIG. 4, the retainer 22 includes an annular member 25 and a plurality of fingers 27. Each of the plurality of fingers 27 functions as a spring. In this embodiment, the retainer 22 includes six fingers 27 (only two fingers are shown in FIG. 4).

The armature assembly 14 includes a shaft 30 which is rotatably supported by the case assembly 12 as shown in FIG. 1. The shaft 30 includes a load end portion 32 and a retained end portion 34. The bearing 20 rotatably supports the retained end portion 34 while a ball bearing assembly 36 rotatably supports the load end portion 32. The armature assembly 14 further includes a commutator 38, lamina 40 and windings 42.

Formed in a wall 44 of the case 16 is a recessed area, generally indicated by the reference numeral 46. The recessed area 46 includes a first recessed segment 48 and a second recessed segment 50 as shown in FIG. 5. The dotted lines in FIG. 5 defines the boundary of the first recessed segment 48 and the second recessed segment 50.

A portion of the bearing 20 is positioned in the recessed area 46 as shown in FIG. 4. Note that the curved outer ring surface 21 of the bearing 20 contacts the wall 44 within the recessed area 46 as shown in FIG. 4. The retainer 22 is positioned in contact with the bearing 20 so as to secure the bearing 20 in place. So secured, the portion of the bearing 20 located within the recessed area 46 extends through the first recessed segment 48 and into the second recessed segment 50. The plurality of fingers 27 of retainer 22 cooperate with the wall 44 of the case 16 in the first recessed segment 48 so as to secure the retainer in place as shown in FIG. 4. The retained end portion 34 of the shaft 30 is rotatably supported by the inner ring surface 23 of the bearing 20 within the recessed area 46.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected. For example, while the recessed area 46 is shown as an area created by forming an indentation in a single piece of metal such as wall 44, it should be understood that the recessed area could also be formed by creating a hole in a single piece of metal (e.g. wall 44) through which the bearing 20 and/or the shaft 30 would extend. Thereafter, a covering could be secured to the single piece of metal (e.g. wall 44) over the retainer 20 and/or shaft 30 so as to envelope these components. The seam where the covering and the single piece of metal (e.g. wall 44) would be joined, of course, would be environmentally sealed by conventional means to protect the internal components of the motor from contaminants present in the ambient surroundings such as dirt or dust particles.

What is claimed is:

1. A motor which includes a shaft having an end portion, comprising:
   a case having a wall having an inner side and an outer side, said wall defining an inner annular recessed area on said inner side and an outer annular recessed area on said outer side; said inner and outer sides being situated opposite each other;
   a bearing which supports the end portion of the shaft, a portion of said bearing being positioned in the inner annular recessed area; and
   said end portion being situated in said inner annular recessed area when said bearing is situated in said motor said inner and outer annular recessed areas being located on opposite sides of said wall.

2. The motor of claim 1, further comprising:
   a retainer which secures the portion of said bearing in the inner annular recessed area.

3. The motor of claim 2, wherein said retainer comprises:
   an annular member which contacts said bearing; and
   a plurality of fingers secured to said annular member, each of said plurality of fingers contacts the wall of said case in the inner annular recessed area.

4. The motor of claim 3, wherein each of said plurality of fingers is a spring.

5. The motor of claim 1, wherein:
   said bearing is annular and defines an outer ring surface, and
   a cross-section of the outer ring surface defines a convex curve.

6. The motor of claim 5, further comprising a retainer which forces the outer ring surface of said bearing against the wall of said case in the inner annular recessed area.

7. The motor of claim 6, wherein:
   said bearing further defines an inner ring surface, and
   a cross-section of the inner ring surface defines a line.

8. The motor of claim 7, wherein the inner ring surface supports the end portion of the shaft within the inner annular recessed area.

9. The motor of claim 8, further comprising a retainer which secures the portion of said bearing in the inner annular recessed area, wherein:
   the inner annular recessed includes a first recessed segment and a second recessed segment,
   a part of said retainer is located in the first recessed segment, and
   the portion of said bearing extends through the first recessed segment and into the second recessed segment.

10. A motor, comprising
    a shaft having a load end portion and a retained end portion;
    a case assembly having a first end wall and a second end wall, wherein the first end wall has a curved cross-sectional shape defining an inner annular recessed area and an outer annular recessed area, and the second end wall has an opening defined therein through which the load end portion of said shaft extends;
    a bearing which rotatably supports the retained end portion of said shaft, a portion of said bearing being positioned in the inner annular recessed area;
    said end portion being situated in said inner annular recessed area when said bearing is situated in said motor said inner and outer annular recessed areas being located on opposite sides of said first end wall.

11. The motor of claim 10, further comprising:
    a retainer which secures the portion of said bearing in said inner annular recessed area.

12. The motor of claim 11, wherein said retainer comprises:
    an annular member which contacts said bearing; and
    a plurality of fingers secured to said annular member, each of said plurality of fingers contacts the first end wall of said case in said inner annular recessed area.

13. The motor of claim 12, wherein each of said plurality of fingers is a spring.

14. The motor of claim 10, wherein:
    said bearing is annular and defines an outer ring surface, and
    a cross-section of the outer ring surface defines a convex curve.

15. The motor of claim 14, further comprising a retainer which forces the outer ring surface of said bearing against the wall of said case in the recessed area.

16. The motor of claim 15, wherein:
    said bearing further defines an inner ring surface, and
    a cross-section of the inner ring surface defines a line.

17. The motor of claim 16, wherein the inner ring surface supports the retained end portion of the shaft within the inner annular recessed area.

18. The motor of claim 17, further comprising a retainer which secures the portion of said bearing in the recessed area, wherein:

said wall defining a first recessed segment and a second recessed segment, a part of said retainer is located in the first recessed segment, and the portion of said bearing extends through the first recessed segment and into the second recessed segment.

* * * * *